Patented Apr. 22, 1952

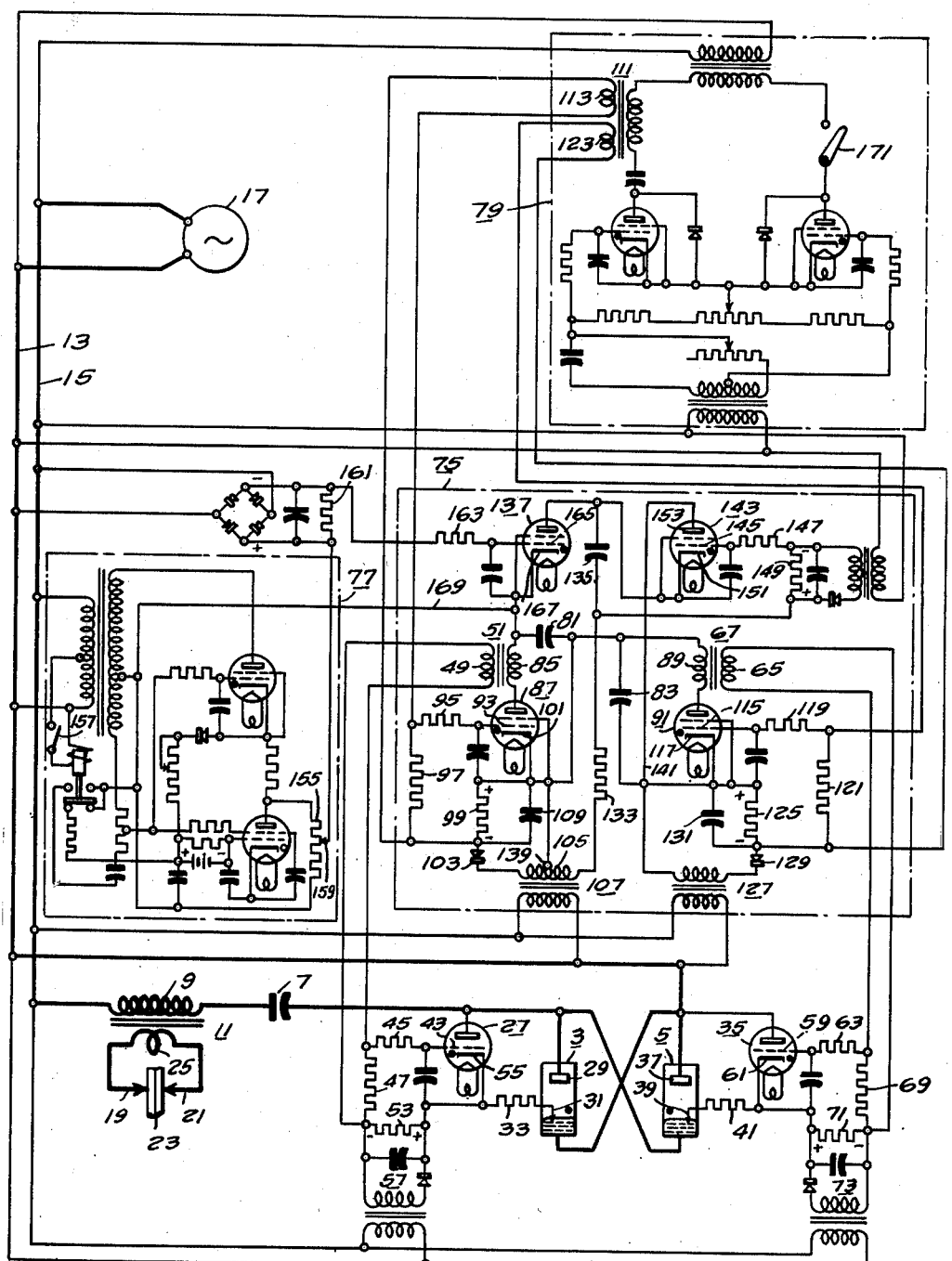

2,594,016

UNITED STATES PATENT OFFICE 2,594,016

CONTROL CIRCUITS

Edward C. Hartwig, Pittsburgh, Pa., assignor to Westinghouse Electric Corporation, East Pittsburgh, Pa., a corporation of Pennsylvania Application January 18, 1946, Serial No. 642,041

10 Claims. (Cl. 250—27)

This invention relates to an electronic control circuit and has particular relation to a control circuit for controlling the supply of current from a source of alternating voltage to a load such as a resistance welding load.

In certain resistance welding apparatus constructed in accordance with the teachings of the prior art, a welding transformer is supplied with current from an alternating voltage supply source through a pair of inversely connected electric valves of the arc-like type, such as ignitrons. Various circuits are provided to render the ignitrons conductive alternately in opposite half-periods of the supply voltage throughout a predetermined time interval with the instant at which an ignitron is rendered conductive in a half-period being selectable to determine the heat produced at the weld. Such prior apparatus on the whole operates satisfactorily, but it has a limited range of selection of the instant in a half-period at which an ignitron is rendered conductive and does not permit an ignitron to become conductive at the instant corresponding to a zero supply voltage.

However, a wide range of selection is many times desirable; and when a series capacitor is employed in the load circuit to correct the power factor so that the voltage on the capacitor at the instant of zero supply voltage makes positive the anode of the ignitron to be next conductive, it is particularly desirable to render the ignitron conductive at that instant.

It is accordingly an object of my invention to provide a new and improved control circuit for controlling the supply of current from an alternating voltage source to a load.

Another object of my invention is to provide a new and improved control apparatus for use in controlling the supply of current from an alternating voltage source to a load through inversely connected electric valves in which the valves may be rendered conductive at a selected instant in a half-period of the supply voltage.

A further object of my invention is to provide a novel control apparatus for controlling the supply of current from an alternating voltage source to a load through a pair of inversely connected electric valves in which the instant in a half-period at which a valve becomes conductive is selectable over a wide range including the instant corresponding to zero supply voltage.

In accordance with my invention, a wide range of selection of the instant in a half-period at which a main valve becomes conductive is permissible through the provision of a time delay of one half-period between the timing control and the actual control of the main valves.

The features of my invention which I consider novel are set forth with greater particularity in the accompanying claims. The invention itself, however, together with additional objects and advantages thereof, may be better understood from the following description of a specific embodiment thereof when read in connection with the accompanying drawings in which the single figure is a schematic circuit diagram of resistance welding apparatus embodying my invention.

As shown in the drawing, the power circuit of the apparatus comprises a pair of main electric valves 3 and 5 of the arc-like type, preferably ignitrons, connected inversely with each other and in series with a capacitor 7 and the primary winding 9 of a welding transformer 11 between a pair of supply lines 13 and 15 energized from an alternating voltage source 17. A pair of welding electrodes 19 and 21 and the material 23 to be welded are connected in series across the secondary winding 25 of the welding transformer 11. The capacitor 7 in series with the primary winding 9 of the welding transformer 11, is employed to correct the power factor but may be omitted if desired.

An electric discharge valve 27 of the arc-like type, preferably a thyratron, is connected between the anode 29 and the ignition electrode 31 of the first main valve 3 through a current limiting resistor 33. A similar valve 35 is connected between the anode 37 and ignition electrode 39 of the second main valve 5 through a current limiting resistor 41. These two valves 27 and 35 are hereinafter referred to as firing valves.

The control circuit of the firing valve 27 for the first main valve 3 extends from the control grid 43 thereof through a grid resistor 45, a resistor 47 in parallel with a secondary winding 49 of a first firing transformer 51 and a biasing resistor 53 to the cathode 55. A biasing voltage is impressed across the biasing resistor 53 by a suitable means usch as a rectified current supply circuit 57 energized from the alternating voltage supply lines. The biasing voltage on the biasing resistor 53 tends to maintain the first firing valve 27 non-conductive so that it becomes conductive only when a voltage sufficient to overcome the biasing voltage is impressed in the control circuit through the first firing transformer 51. When the first firing valve 27 becomes conductive, a current flows through that valve and the ignition electrode 31 of the corresponding first main valve 3 to render the main valve conductive.

A similar control circuit for the second firing valve 35 extends from the control grid 59 to the cathode 61 thereof and includes a grid resistor 63, a secondary winding 65 of a second firing transformer 67 in parallel with a resistor 69, and a biasing resistor 71 having a biasing voltage supplied thereacross through a suitable rectifier circuit 73 energized from the supply lines. When the second firing valve 35 conducts, current flows through the ignition electrode 39 of the second main valve 5 to render that main valve conductive.

The supply of voltage impulses through the firing transformers 51 and 67 to cause the main valves to become conductive is controlled by an intermediate circuit 75 which in turn is controlled by a timing circuit 77 and a heat control circuit 79.

The intermediate circuit 75 includes a first capacitor 81 corresponding to the first main valve 3 and a second capacitor 83 corresponding to the second main valve 5. The primary winding 85 of the first firing transformer 51 is connected in series with an auxiliary electric valve 87 across the first capacitor 81 to form a discharge circuit therefor. This auxiliary valve 87 is preferably of the arc-like type, such as a thyratron, and is hereinafter referred to as the first discharging valve.

The primary winding 89 of the second firing transformer 67 is connected in series with another auxiliary valve 91 across the second capacitor 83 to form a discharge circuit therefore. This auxiliary valve 91 is also preferably of the arc-like type, such as a thyratron, and is hereinafter referred to as the second discharging valve.

The control circuit of the first discharging valve 87 extends from the control grid 93 thereof through a grid resistor 95, another resistor 97 and a biasing resistor 99 to the cathode 101. A biasing voltage exists across the biasing resistor 99 by virtue of current supplied through a rectifier 103 from the left hand portion of the secondary winding 105 of an auxiliary transformer 107 energized from the alternating voltage supply lines 13 and 15. A capacitor 109 is connected across the biasing resistor 99 to smooth out the voltage ripple.

The biasing voltage on resistor 99 tends to maintain the first discharging valve 87 non-conductive so that it may be rendered conductive only by a voltage overcoming the biasing voltage which may be impressed across the resistor 97 in the control circuit through another auxiliary transformer 111, the secondary winding 113 of which is connected across the resistor 97. The auxiliary transformer 111 is a part of the heat control circuit 79 to be described hereinafter.

The control circuit of the second discharging valve 91 is similar to that of the first discharging valve 87 and extends from the control grid 115 to the cathode 117 and includes a grid resistor 119, another resistor 121 in parallel with a second secondary winding 123 of the auxiliary transformer 111 in the heat control circuit, and a biasing resistor 125. A biasing voltage is supplied across the biasing resistor 125 from another auxiliary supply transformer 127 through a rectifier 129 with a capacitor 131 in parallel with the resistor 125 to smooth out the voltage ripple.

It is then evident that when a discharging valve is rendered conductive to discharge the corresponding one of the capacitors 81 and 83 through the primary winding of the corresponding firing transformer, a voltage impulse is supplied in the control circuit of the corresponding firing valve to cause the corresponding main valve to become conductive.

A charging circuit is provided for each of the capacitors 81 and 83 which is energized by the voltage appearing across the right hand portion of the secondary winding 105 of the auxiliary transformer 107. The charging circuit for the first capacitor 81 extends from the right hand end of the secondary winding 105 through a resistor 133, a control capacitor 135, another electric valve 137 and the first capacitor 81 to the intermediate tap 139 on the secondary winding 105. This last-mentioned valve 137 is of the arc-like type, preferably a thyratron, and is hereinafter referred to as the first charging valve. This valve 137 is controlled by the timing circuit 77.

The charging circuit for the second capacitor 83 extends from the intermediate tap 139 of the secondary winding 105 through the second capacitor 83, a conductor 141, another electric valve 143 of the arc-like type, such as a thyratron, hereinafter referred to as the second charging valve, the control capacitor 135 and the resistor 133 to the right hand end of the secondary winding 105. It is therefore obvious that the first charging valve 137 may conduct current to charge the first capacitor 81 only in half-periods of the supply voltage of one polarity while the second charging valve 143 may conduct current to charge the second capacitor 83 only in half-periods of the opposite polarity. The arrangement is such that the first capacitor 81 may be charged only in a half-period of a polarity opposite to that in which the corresponding first main valve 3 may conduct current. Similarly, the second capacitor 83 may be charged only in a half-period of opposite polarity to that in which the second main valve 5 may be conductive.

While the first charging valve 137 is controlled directly by the timing circuit 77, the second charging valve 143 is controlled by what is known as a follow-up circuit. The control circuit for the second charging valve 143 extends from the control grid 145 thereof through a grid resistor 147, a biasing resistor 149, and the control capacitor 135 to the cathode 151. A biasing voltage exists across the biasing resistor 149 tending to maintain the second charging valve 143 non-conductive. However, when the first charging valve 137 conducts current to charge the first capacitor 81, that current also charges the control capacitor 135. The voltage across the charged control capacitor 135 opposes the biasing voltage across the resistor 149 and causes the second charging valve 143 to become conductive in the next half-period of the supply voltage when its anode 153 becomes positive. Thus every time the first charging valve 137 becomes conductive, the second charging valve 143 is rendered conductive in the next succeeding half-period.

The timing circuit 77 which controls the first charging valve is similar to that shown in the copending application of Stadum and Freeman, Serial No. 642,042, filed January 18, 1946. The timing circuit includes an output resistor 155 through which current flows in each half-period of the alternating supply voltage of one polarity throughout a predetermined time interval following operation of a starting switch 157. The details of the operation of the timing circuit may be found in the aforesaid copending application of Stadum and Freeman.

An intermediate tap 159 on the output resistor 155 is connected through a biasing resistor 161 and a grid resistor 163 to the control electrode 165 of the first charging valve 137 while the cathode 167 thereof is connected to the lower end of the output resistor through conductor 169. A biasing voltage tending to maintain the first charging valve 137 non-conductive appears across the resistor 163 and is opposed by the voltage created across output resistor 155 by the flow of current therethrough. The arrangement is such that the current flows through the output resistor 155 in the half-periods in which the first charging valve 137 may conduct. Thus, the first charging valve 137 is rendered conductive in each half-period in which the corresponding main valve 3 cannot conduct throughout a predetermined time interval.

The heat control circuit 79 which controls the operation of the discharging valves 87 and 91 is shown and described in my copending application, Serial No. 642,040 filed January 18, 1946, now Patent No. 2,504,834. The heat control circuit is effective upon closure of a hand switch 171 to produce a voltage impulse in each of the secondary windings 113 and 123 of an output transformer at a preselected instant in each half-period of the alternating supply voltage, with the pulses in successive half-periods being of opposite polarities.

The secondary windings 113 and 123 are connected in the corresponding control circuits in such a way that the voltage pulses tend to render the corresponding discharging valve conductive in a half-period of the supply voltage in which the corresponding main valve may conduct current. As explained in my copending application the voltage impulses may be supplied at a time corresponding to zero supply voltage.

In operating the apparatus, the hand switch 171 in the heat control circuit 79 is first closed. As a result, voltage impulses are impressed in the control circuits of the discharging valves 87 and 91 tending to render them conductive alternately in successive half-periods. However, since the capacitors 81 and 83 are not charged, the discharging valves do not then become conductive.

The starting switch 157 in the timing circuit 77 is then closed causing the first charging valve 137 to be rendered conductive in each half-period in which main valve 3 cannot conduct to effect charging of the first capacitor 81. Because of the follow-up control circuit, the second charging valve 143 is rendered conductive in each half-period of opposite polarity to charge the second capacitor 83. At the same time, the first and second capacitors 81 and 83 are discharged in each half-period succeeding the half-period in which each is charged by virtue of the pulses supplied from the heat control circuit 79 which render the discharging valves 87 and 91 conductive. Because of the inductance of the primary windings 85 and 89 in the discharge circuits of capacitors 81 and 83, each of the discharging valves 87 and 91 becomes non-conductive before the corresponding charging valve 137 or 143 again becomes conductive. As each capacitor 81 and 83 is discharged, a voltage impulse is impressed in the control circuit of the corresponding firing valve to render it conductive, which in turn, renders the corresponding main valve conductive.

This operation continues with the main valves 3 and 5 being rendered conductive alternately in opposite half-periods at a preselected instant in such half-period until after the expiration of the preselected time interval at which time the first charging valve is prevented from becoming conductive and charging of the capacitors 81 and 83 is halted. It is apparent that the main valves 3 and 5 are rendered conductive once more after the last charging of the capacitor 81 through the first charging valve so that the actual control of the main valves is delayed by one half-period of the supply voltage behind the operation of the timing circuit itself. This enables the heat control circuit to effect the discharging of the capacitors 81 and 83 and consequently the rendering conductive of the main valves 3 and 5 at any selected instant in a corresponding half-period including that at which the supply voltage is substantially zero.

Although I have shown and described a particular heat control circuit, it is obvious that various other suitable circuits may be employed to supply the desired impulses in the control circuits of the discharging valves. Likewise, other timing circuits may be employed to time the operation of the charging valves although that disclosed is particularly suitable in connection with the specific intermediate circuit here shown.

Although I have shown and described a specific embodiment of my invention, I am aware that many other modifications may be made without departing from the spirit of the invention. I do not intend therefore to limit my invention to the particular embodiment disclosed.

I claim as my invention:

1. Control apparatus for supplying current from a source of alternating voltage to a load, comprising a pair of electric valves of the arc-like type to be connected in circuit with said source and load to control the supply of current, said valves being connected inversely whereby they may be conductive in half-periods of said source voltage of opposite polarity; a pair of capacitors corresponding individually to different ones of said valves; means including timing apparatus adapted to conduct during alternate half-periods of said sources when performing a timing operation and in so conducting causing each of said capacitors to be charged in each half-period of said source voltage of opposite polarity to that in which the corresponding valve may conduct throughout a preselected time interval; adjustable timing means connected to each capacitor for discharging that capacitor at a preselected instant in each half-period in which the corresponding valve may conduct, said preselected instant being determinable at the will of the operator; means connected to each valve and responsive to the discharge of the corresponding capacitor for rendering the valve conductive; and means for maintaining each said valves non-conductive regardless of the polarity of its anode-cathode potential until rendered conductive by the discharge of its corresponding capacitor.

2. Control apparatus for supplying current from a source of alternating voltage to a load, comprising a pair of electric valves of the arc-like type to be connected in circuit with said source and load to control the supply of current, said valves being connected inversely whereby they may be conductive in half-periods of said source voltage of opposite polarity, and said load being of the type capable of introducing a shift in the phase of the potential impressed on said valves relative to the potential of said source, such that the anode-cathode potential of one of said valves may at times be positive at instants when said source potential is substantially zero; a pair of capacitors corresponding individually to different ones of said valves; means including timing apparatus adapted to conduct during alternate half-periods of said sources when performing a timing operation and in so conducting causing each of said capacitors to be charged in each half-period of said source voltage of opposite polarity to that in which the corresponding valve may conduct throughout a preselected time interval; means connected to each capacitor for discharging that capacitor at a preselected instant in each half-period in which the corresponding valve may conduct, said preselected instant being determinable at the will of the operator; means connected to each valve and responsive to the discharge of the corresponding capacitor for rendering the valve conductive; and means for maintaining each said valves non-conductive regardless of the polarity of its anode-cathode potential until rendered conductive by the discharge of its corresponding capacitor.

3. Control apparatus for supplying current from a source of alternating voltage to a load, comprising a pair of main electric valves of the arc-like type to be connected in circuit with said source and load to control the supply of current, said main valves being connected inversely whereby they may be conductive in half-periods of said source voltage of opposite polarity; a pair of capacitors corresponding individually to different ones of said main valves; means including timing apparatus adapted to conduct during alternate half-periods of said sources when performing a timing operation and in so conducting causing each of said capacitors to be charged in each half-period of said source voltage of opposite polarity to that in which the corresponding main valve may conduct throughout a preselected time interval; a discharge circuit including an auxiliary valve connected across each capacitor; control means connected to each auxiliary valve for causing it to become conductive to effect rapid discharge of the corresponding capacitor at a preselected instant in each half-period in which the corresponding main valve may conduct, said preselected instant being determined at the will of the operator; means connected to each main valve and responsive to the discharge of the corresponding capacitor for rendering the main valve conductive; and means for maintaining each said main valves non-conductive regardless of the polarity of its anode-cathode potential until rendered conductive by the discharge of its corresponding capacitor.

4. Control apparatus for supplying current from a source of alternating voltage to a load, comprising a pair of electric valves of the arc-like type to be connected in circuit with said source and load to control the supply of current, said valves being connected inversely whereby they may be conductive in half-periods of said source voltage of opposite polarity; a pair of capacitors corresponding individually to different ones of said valves; timing means for producing a predetermined control voltage during alternate half-periods of said source voltage of one polarity throughout a preselected time interval; means responsive to said control voltage for causing each of said capacitors to be charged in each half-period of said source voltage of opposite polarity to that in which the corresponding valve may conduct; a normally incomplete discharge circuit connected across each of said capacitors; means for completing each discharge circuit individually at a preselected instant in each half-period in which the corresponding valve may conduct, said preselected instant being determined at the will of the operator; means connected to each valve and responsive to the discharge of the corresponding capacitor for rendering the valve conductive; and means for maintaining each said valves non-conductive regardless of the polarity of its anode-cathode potential until rendered conductive by the discharge of its corresponding capacitor.

5. Control apparatus for supplying current from a source of alternating voltage to a load, said load including a highly inductive component and a power factor correcting capacitor, and said load being of the type which is supplied with current during intermittent short intervals of the order of several half-periods of said supply; comprising a pair of electric valves of the arc-like type to be connected in circuit with said source and load to control the supply of current, said valves being connected inversely whereby they may be conductive in half-periods of said source voltage of opposite polarity; a pair of capacitors corresponding individually to different ones of said valves; timing means for producing a predetermined control voltage during alternate half-periods of said source voltage of one polarity throughout a preselected time interval; means responsive to said control voltage for causing each of said capacitors to be charged in each half-period of said source voltage of opposite polarity to that in which the corresponding valve may conduct; a normally incomplete discharge circuit connected across each of said capacitors; means for completing each discharge circuit individually at a preselected instant in each half-period in which the corresponding valve may conduct, said preselected instant being determined at the will of the operator; means connected to each valve and responsive to the discharge of the corresponding capacitor for rendering the valve conductive; and means for maintaining each said valves non-conductive regardless of the polarity of its anode-cathode potential until rendered conductive by the discharge of its corresponding capacitor.

6. Control apparatus for supplying current from a source of alternating voltage to a load, comprising a pair of main electric valves of the arc-like type to be connected in circuit with said source and load to control the supply of current, said main valves being connected inversely whereby they may be conductive in half-periods of said source voltage of opposite polarity; a pair of capacitors corresponding individually to different ones of said main valves, a charging circuit connected to each capacitor and including an auxiliary source of current and an auxiliary valve; a timing circuit adapted to conduct during alternate half-periods of said sources when performing a timing operation and in so conducting effective to cause each auxiliary valve to be conductive to charge the corresponding capacitor in each half-period of said source voltage of opposite polarity to that in which the corresponding main valve may conduct throughout a preselected time interval; means connected to each capacitor for discharging that capacitor at a preselected instant in each half-period in which the corresponding main valve may conduct, said preselected instant being determined at the will of the operator; means connected to each main valve and responsive to the discharge of the corresponding capacitor for rendering the main valve conductive; and means for maintaining each said valves non-conductive regardless of the polarity of its anode-cathode potential until rendered conductive by the discharge of its corresponding capacitor.

7. Control apparatus for supplying current from a source of alternating voltage to a load, comprising a pair of main electric valves of the arc-like type to be connected in circuit with said source and load to control the supply of current, said main valves being connected inversely whereby they may be conductive in half-periods of said source voltage of opposite polarity; a pair of capacitors corresponding individually to different ones of said main valves; a charging circuit connected to each capacitor and including an auxiliary source of current and a first auxiliary valve; a timing circuit adapted to conduct during alternate half-periods of said sources when performing a timing operation and in so conducting effective to cause the first auxiliary valve to be conductive to charge the corresponding capacitor in each half-period of said source voltage of opposite polarity to that in which the corresponding main valve may conduct throughout a preselected time interval; a discharge circuit including a second auxiliary valve connected across each capacitor; control means connected to each second auxiliary valve for causing it to become conductive to effect rapid discharge of the corresponding capacitor at a preselected instant in each half-period in which the corresponding main valve may conduct, said preselected instant being determined at the will of the operator; means connected to each main valve and responsive to the discharge of the corresponding capacitor for rendering the main valve conductive; and means for maintaining each said valves non-conductive regardless of the polarity of its anode-cathode potential until rendered conductive by the discharge of its corresponding capacitor.

8. Control apparatus for supplying current from a source of alternating voltage to a load, comprising a pair of electric valves of the arc-like type to be connected in circuit with said source and load to control the supply of current, said valves being connected inversely whereby they may be conductive in half-periods of said source voltage of opposite polarity; a pair of capacitors corresponding individually to different ones of said valves; means including timing apparatus adapted to conduct during alternate half-periods of said sources when performing a timing operation and in so conducting causing each of said capacitors to be charged in each half-period of said source voltage of opposite polarity to that in which the corresponding valve may conduct throughout a preselected time interval; means connected to each capacitor for discharging that capacitor at a preselected instant in each half-period in which the corresponding valve may conduct, said preselected instant being determinable at the will of the operator and occurring at any instant throughout said half-period; means connected to each valve and responsive to the discharge of the corresponding capacitor for rendering the valve conductive; and means for maintaining each said valves non-conductive regardless of the polarity of its anode-cathode potential until rendered conductive by the discharge of its corresponding capacitor.

9. In combination, terminals for supplying potential; a first thyratron having an anode and a cathode, a capacitor connected in series with said anode and cathode and said terminals; a second thyratron having an anode, a cathode and a grid; a first circuit including in series said last-named anode, said last-named cathode, said capacitor and said terminals; and a second circuit including in series said grid, said last-named cathode and said capacitor; said anode of said first thyratron and said cathode of said second thyratron being connected to one plate of said capacitor.

10. In combination a capacitor; a first thyratron having an anode and a cathode; terminals for supplying a potential; a second thyratron including an anode, a cathode and a grid; a circuit for charging said capacitor to one polarity including in series said anode and said cathode of said first thyratron, said capacitor and said terminals; a circuit for discharging said capacitor and recharging it to the opposite polarity including in series said anode of said second thyratron, said cathode of said second thyratron and said capacitor, and connections between said capacitor and said grid and said cathode of said second thyratron connecting the plate of said capacitor which is negative when said capacitor is recharged to said grid and the other plate to said cathode of said second thyratron.

EDWARD C. HARTWIG.

REFERENCES CITED

The following references are of record in the file of this patent:

UNITED STATES PATENTS

| Number | Name | Date |
| --- | --- | --- |
| 2,289,321 | Collom | July 7, 1942 |
| 2,428,592 | Stadum | Oct. 7, 1947 |